(12) United States Patent
García Portillo et al.

(10) Patent No.: US 6,709,585 B1
(45) Date of Patent: Mar. 23, 2004

(54) PURIFICATION SYSTEM FOR WASTEWATER COMING FROM FRUIT AND VEGETABLE PROCESSING PLANTS AND PHYTOSANITARY TREATMENTS IN THE FIELD

(75) Inventors: Manuel García Portillo, Paterna (ES); Elías Salvador Aviño, Paterna (ES); Javier Olivares Vicente, Paterna (ES); Rafael Llamas De Andrés, Paterna (ES); María de los Angeles Soriano Jiménez, Paterna (ES); Juan Pablo Lorenzo Blanco, Paterna (ES)

(73) Assignee: Tecnidex, Tecnicas de Desinfeccion, S.A., Paterna (ES)

( * ) Notice: Subject to any disclaimer, the term of this patent is extended or adjusted under 35 U.S.C. 154(b) by 0 days.

(21) Appl. No.: 09/890,489

(22) PCT Filed: Feb. 3, 2000

(86) PCT No.: PCT/ES00/00033

§ 371 (c)(1),
(2), (4) Date: Jul. 31, 2001

(87) PCT Pub. No.: WO00/46160

PCT Pub. Date: Aug. 10, 2000

(30) Foreign Application Priority Data

Feb. 3, 1999 (ES) .......................................... 9900280 U

(51) Int. Cl.$^7$ .............................. C02F 1/28; C02F 1/52
(52) U.S. Cl. ....................... 210/202; 210/208; 210/265; 210/103; 210/196
(58) Field of Search ............................... 210/103, 202, 210/265, 208, 196

(56) References Cited

U.S. PATENT DOCUMENTS

| | | | | |
|---|---|---|---|---|
| 3,658,697 A | * | 4/1972 | Huether ........................ | 210/617 |
| 4,507,208 A | * | 3/1985 | Simon et al. ................. | 210/721 |
| 4,663,047 A | * | 5/1987 | Krauthausen et al. ........ | 210/616 |
| 4,692,250 A | * | 9/1987 | Miller .......................... | 210/619 |
| 4,824,577 A | * | 4/1989 | Schwitzgelbel .............. | 210/665 |
| 5,061,367 A | * | 10/1991 | Hatch et al. .................. | 210/137 |
| 5,227,528 A | * | 7/1993 | Webster et al. .............. | 564/498 |
| 5,692,461 A | * | 12/1997 | Crovato et al. .............. | 123/41.14 |
| 6,001,246 A | * | 12/1999 | Suenkonis ................... | 210/180 |
| 6,319,414 B1 | * | 11/2001 | Wiseburgh et al. .......... | 210/739 |

FOREIGN PATENT DOCUMENTS

| | | |
|---|---|---|
| EP | 0 316 687 A1 | 5/1989 |
| EP | 0 426 160 A1 | 5/1991 |
| EP | 0 447 923 A1 | 9/1991 |
| ES | 2 095 193 | 7/1995 |
| WO | WO 94/25401 | 11/1994 |
| WO | WO 94/29224 | 12/1994 |

OTHER PUBLICATIONS

"Waste water purifier" by Elf Atochen–Agn España, s.a. (Spain): Publication No.:U 930 1506, p. 124.

* cited by examiner

Primary Examiner—Blaine Copenheaver
Assistant Examiner—Douglas J. Theisen
(74) Attorney, Agent, or Firm—Klauber & Jackson

(57) ABSTRACT

Said equipment include a tank-filter (1, 15) in which a pretreatment stage is carried out. The tank (1) is a decanter to which a flocculant that is uniformly mixed with an agitator (3) can be added. The sludge is removed by delivering it to a filter bag (5). The permeates are then fed to a collecting tank (6) and pumped to the same tank (7) receiving the clarified waters. The permeates are then decanted from said tank (7) through a safety filter (8) to a battery of activated carbon columns (9) where they arm purified by adsorption until the established threshold values have been reached. In another embodiment, the reservoir-filter (15) is a polypropylene bag filter with diatomaceous earth, wherein the liquid passes directly to the decanting tank and is then pumped to the battery of activated carbon columns (9).

6 Claims, 4 Drawing Sheets

US 6,709,585 B1

PURIFICATION SYSTEM FOR WASTEWATER COMING FROM FRUIT AND VEGETABLE PROCESSING PLANTS AND PHYTOSANITARY TREATMENTS IN THE FIELD

OBJECT OF THE INVENTION

This invention, as stated in the heading to this descriptive report, concerns a purification system for wastewater coming from fruit and vegetable processing plants and phytosanitary treatment in the field, with which notable relevant and advantageous characteristics are contributed compared to present conventional purification systems.

The wastewater from chemical products generated in fruit and vegetable processing plants is purified in the different systems of application that are used: drenchers (pallet dousers), fungicide applicators, wax applicators, treatment lines and treatment pools, etc., along with the purification of waste liquid left over from phytosanitary treatments carried out in the field.

BACKGROUND OF THE INVENTION

For purification of water contaminated with pesticides, a treatment sequence is currently followed of: conventional filtration—activated carbon—biological degradation, as considered in the decontamination system of invention patent with publication number ES2050909 referring to the detoxification of solutions that could contain toxic substances such as pesticide residues.

The system consists of a tank where the liquid is collected, fitted with a basket made of a grating with a hole size of 0.8 mm. The tank has an air inlet for the introduction of compressed air that is mixed with the liquid, thereby improving the degradation of toxic materials in the liquid.

The toxicity level of the water in the tank is established so that, depending on this level, the water is transferred to the appropriate decontamination subsystems.

With a high level of toxicity, the water is conducted to a retaining tank, fed with a constant source of compressed air.

The treated liquid passes through an earth bed reactor. The reactor includes a layer of earth on a series of permeable concrete blocks. The liquid is applied to the upper part of the layer of earth by means of a network of conventional drip irrigation pipes. The earth bed reactor contains microorganisms that utilise the organic materials employed as the pesticide as a source of nutrients.

The liquid is diverted from the earth filter to an activated carbon filter. This filter can include a layer of alumina with potassium permanganate for oxidising toxic materials.

The final phase of the decontamination system is a settling basin, i.e., an open permeable pool. This basin does not just eliminate a substantial part of the water by evaporation, it also improves the quality of the water by eliminating traces of pesticides. The basin is stocked with species of animals and plants for the additional degradation of the organic material contained in the water.

If wished, a conventional ozonisation system can be included in the system for the introduction of ozone in the rotation tank.

Another system that is known has the treatment sequence: filtration beds with carbon—degradation with specific microorganisms. This method and system for treatment of water is considered in invention patent with publication number WO 94/29224. It considers a system for the purification of water with a high content of organic components, such as waste from agricultural chemicals, and a low DBO.

A porous material is used as a filtration medium, carbon, on which is placed a substrate of specific microorganism (from the Pseudomonas group). The water enters into contact with these microorganisms under aerobic conditions.

The system consists of five tanks in series, through which the wastewater is made the flow.

Following a treatment sequence of: activated carbon—filtration, we can mention the utility model number 9301506 referring to a wastewater purifier consisting of a vat or trough provided with a stirrer and a tank that links to it underneath via an intermediate bypass valve. Contaminated liquid reaches the vat from the fruit and vegetable treatment zone by means of a pipe, driven by a pump in such a way that the contaminated liquid contained in the trough along with a quantity of activated carbon is removed by a stirrer.

When the stirrer is stopped, the bypass valve is opened and the contaminated elements adhered to the carbon fall by means of settlement down to the lower tank, from where they are extracted.

There also exist other filters and a filtration column for totally cleaning the content of the vat of any impurities. The liquid is made to pass through filters in such a way that, by means of closing certain stopcocks before and after an impulsion pump and opening others, the circulation of the fluid from the fruit and vegetable treatment zone towards the vat is prevented, while on the other hand, the circulation of the fluid coming from the vat via the filter circuit is facilitated.

Patent of invention with publication number 0447923A1, referring to a polymer adsorption system, reports an effective filtration medium for oils and greases, liquid hydrocarbon, sterols, organic pesticides and other inert liquid compounds with organic bonds and their mixtures.

The filtration medium consists of polyvinyl acetate, whose particles have a porous structure. The polyvinyl acetate comes in sheet form, in particular constructed in the form of a sandwich containing particles of polyvinyl butyral, and there is also polyvinyl acetate in form of multi-chamber structures.

Using a treatment sequence of: biological treatment with specific strains, mention can be made of invention patent ES2095193 referring to the use of bacterial strains of the *Pseudomonas genera* PCH3 and GCH1 for the bio-restoration of soils and purification of water contaminated with acetamide-based herbicides. This system is characterised by using at least one of the Pseudomonas strains PCH3 and GCH1 for the bio-transformation of water contaminated with herbicides. For this, the necessary nutrients have to be added in order to achieve optimisation of the bio-transformation. The water has to be inoculated for treating in a culture with at least one of the microorganisms mentioned above, which must be immobilised on a solid support of a ceramic, synthetic or organic nature. The immobilised microorganism is added as a bio-catalyst to a bio-reactor, with the conditions being regulated in order to optimise the transformation process of the contaminant compounds.

With a treatment sequence: filtration ultraviolet, invention patent ES2027366 can be mentioned, which discusses an apparatus for water treatment. The apparatus is designed for the purification of drinking water and contains a system for purifying toxic compounds; it is capable of retaining trace quantities.

This apparatus consists of a head with an opening for the entrance of water and another for the outlet, and a set of fitted parts that include filtration means and radiation means.

The filtration means can consist of mechanical fibres and/or chemical adsorption material, and is preferably of the activated carbon type with granular transverse section.

The internal diameter of the filtration means is somewhat greater than the external diameter of the irradiation means. The irradiation means includes an ultraviolet lamp, with or without ozone.

Also using a treatment sequence: (ozone)—ultraviolet—activated carbon, mention can be made of the invention patent WO94/25401, concerning a water purification unit. This system is designed for the purification of drinking water and contains a retaining system for toxic compounds prepared for retaining traces quantities. The water to be purified flows under a powerful source of ultraviolet radiation and then passes through an activated carbon filter fitted on the ultraviolet source. The effluent from the filter is again passed through the ultraviolet radiation source. This source eliminates the microorganisms present and the filter retains particles and other compounds.

An ozone generator can be incorporated into the water inlet in order to boost the destruction of microorganisms present and oxidise the undesirable components of the water.

DESCRIPTION OF THE INVENTION

In general terms, the purification system for wastewater coming from fruit and vegetable processing plants and phytosanitary treatment in the field, constituting the object of the invention, basically includes the following elements:

First of all, it has a settling tank, of truncated conical shape and manufactured in polyester reinforced with fiberglass, with an approximate capacity of 500 l. This tank will contain two or more outlets at different heights for the settling, one of which will be arranged so as to start at the conical base and the other at a higher level, more specifically at 50% of the height of the cylindrical part of that tank. It has a flocculent dosing system and a stirrer for producing a good mix. A filtration system for the sludge is provided at the outlet from the tank, and the sludge then passes to a filtering bag of approximately 820 mm in length and 180 mm in diameter, manufactured in single-filament nylon with a mesh-size of 60 to 75 microns. The product filtered in the bag is then passed to a collection tank of approximately 50 l and from here it is pumped to an intermediate tank of dimensions similar to the one for settling.

From the intermediate tank, the filtered product passes to a self-cleaning ring filter, of mesh-size 75 microns, and then through some activated carbon columns, normally one to three in number, of the order of 300 l in volume and containing approximately 100 kg of carbon. They are manufactured in polystyrene with an exterior reinforcement of fibreglass and epoxy resin.

There is a system of warning lights for indicating when the activated carbon has become exhausted, and also the necessary pumps and valves for the facility.

The wastewater is pumped from the tanks containing the drenchers using conventional pumps.

Sometimes, at the outlet from the array of activated carbon columns, an ultraviolet lamp is incorporated in order to guarantee a greater degree of purification.

The system includes a reverse-wash mechanism permitting a greater yield to be obtained from the activated carbon columns.

In order to facilitate an understanding of the invention, and forming an integral part of this descriptive report, a sheet of plans is attached containing a single figure in which, by way of illustration and not to be regarded as restrictive, the following is represented:

DESCRIPTION OF THE PREFERRED EMBODIMENT OF THE INVENTION

Figure 1:
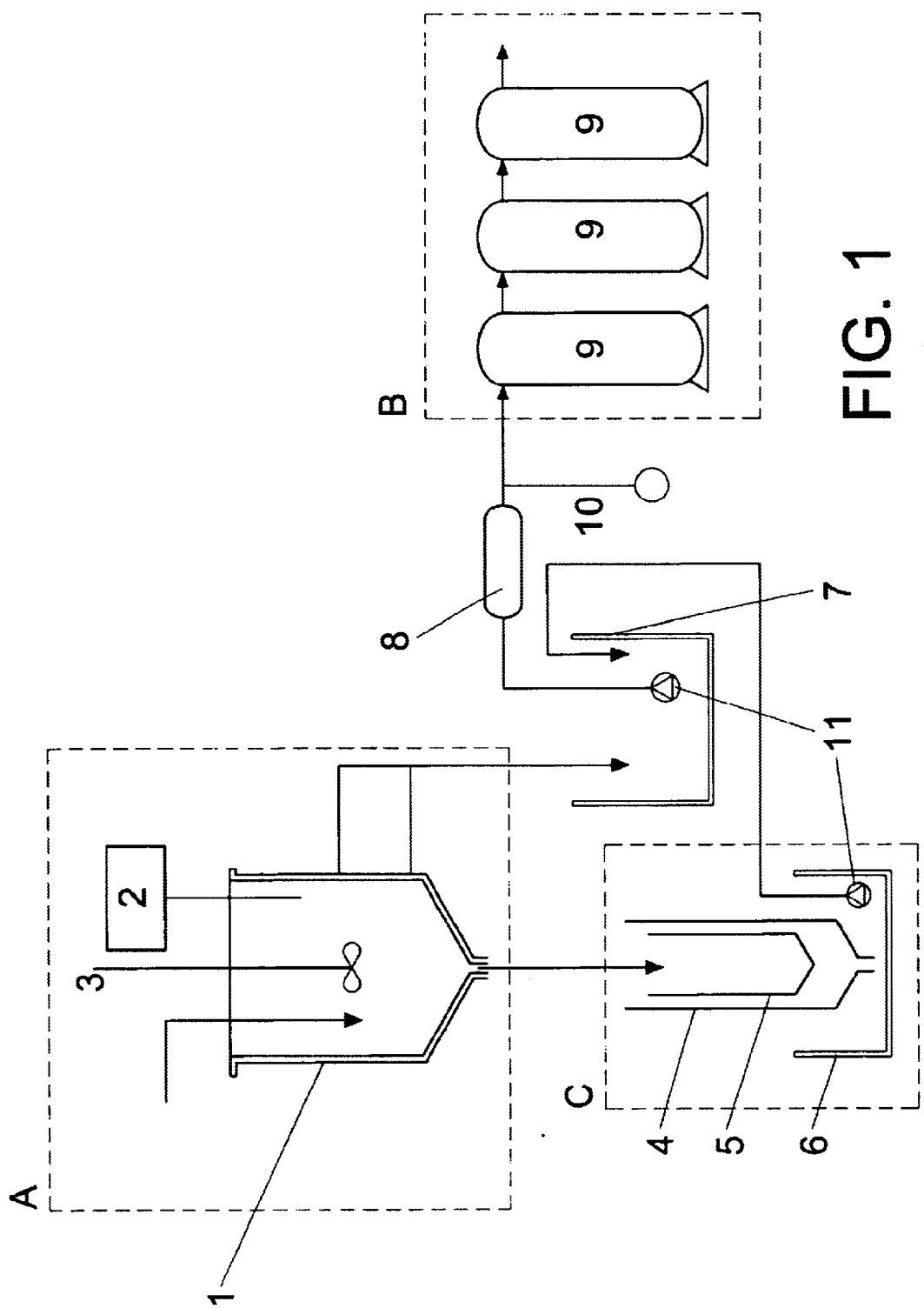
FIG. 1.—This is a diagram of the functioning of the purification system for wastewater coming from fruit and vegetable processing plants and phytosanitary treatment in the field, in accordance with the invention.

Referring to the numbering system adopted in FIG. 1, we can see how the purification system for wastewater coming from fruit and vegetable processing plants and phytosanitary treatment in the field that the invention proposes includes a settling system for the wastewater coming from the fruit washing drenchers. Its function is to separate the suspended solids that the wastewater contains and is composed of a settling tank 1 where the wastewater arrives and where flocculent can be added by means of the flocculation system 2, with mixing by means of a stirrer 3. Following the decanting, the sludge is extracted via the lower part of the tank and the clarified water is transferred to the intermediate tank 7.

The approximate efficiencies in the decanting process using flocculation are:

Suspended solids: 50%

DQO: 20%

Imazalil: 20%

Thiabendazol: 80%

It also includes a sludge treatment system in which the sludge is extracted by gravity from the bottom of the settling tank and arrives at the filtering bag 5, where it is retained and part of the water contained in the sludge is filtered through it. The filtering bag 5 is arranged in a vertical position inside a metal frame 4 which acts as a securing for it and as a collector for the water passing through it on its way to the reception tank 6. This water is pumped from the tank 6 to an intermediate tank 7, where it is combined with the clarified water. The reception tank 6 and the intermediate tank 7 may comprise a stirrer for uniformly mixing the clarified water. The drying of the sludge achieved by means of the filtering bag system is around 50%.

The clarified water and the water from the filtering bag, collected in the intermediate tank 7, are pumped via the ring filter 8. This filter acts as a safety filter for the columns of activated carbon, retaining any remaining solids left in the water.

The system also includes the columns of activated carbon, three of them in the examples shown in the diagram. After passing through the safety filter 8, the clarified water arrives at the columns of activated carbon 9, where it is purified by adsorption, with toxic substances being removed down to the threshold values determined by legislation. The warning indicator light 10 indicates when the first column of activated carbon 9 has become exhausted and needs replacing.

The reference 11 refers to the necessary pumps and valves.

The approximate efficiencies in the columns of carbon are:

Suspended solids: 90%

DQO: 85%

Imazalil: 100%

Thiabendazol: 100%

The ecotoxicity values of the purified water are below 2 U.T.

In the diagram, the settling system for the final fall from the drenchers is referenced with A, and is accessed by the loading mouth of the settling tank 1, as shown by the arrow. In the diagram of FIG. 1, the block of columns of activated carbon 9 is referenced with B. The block referenced with C corresponds to the sludge treatment system.

The arrows appearing in the diagram indicate the route followed through the installation by the product being purified. The treated water is obtained at the outlet from the block B of columns of activated carbon 9.

Figure 2:
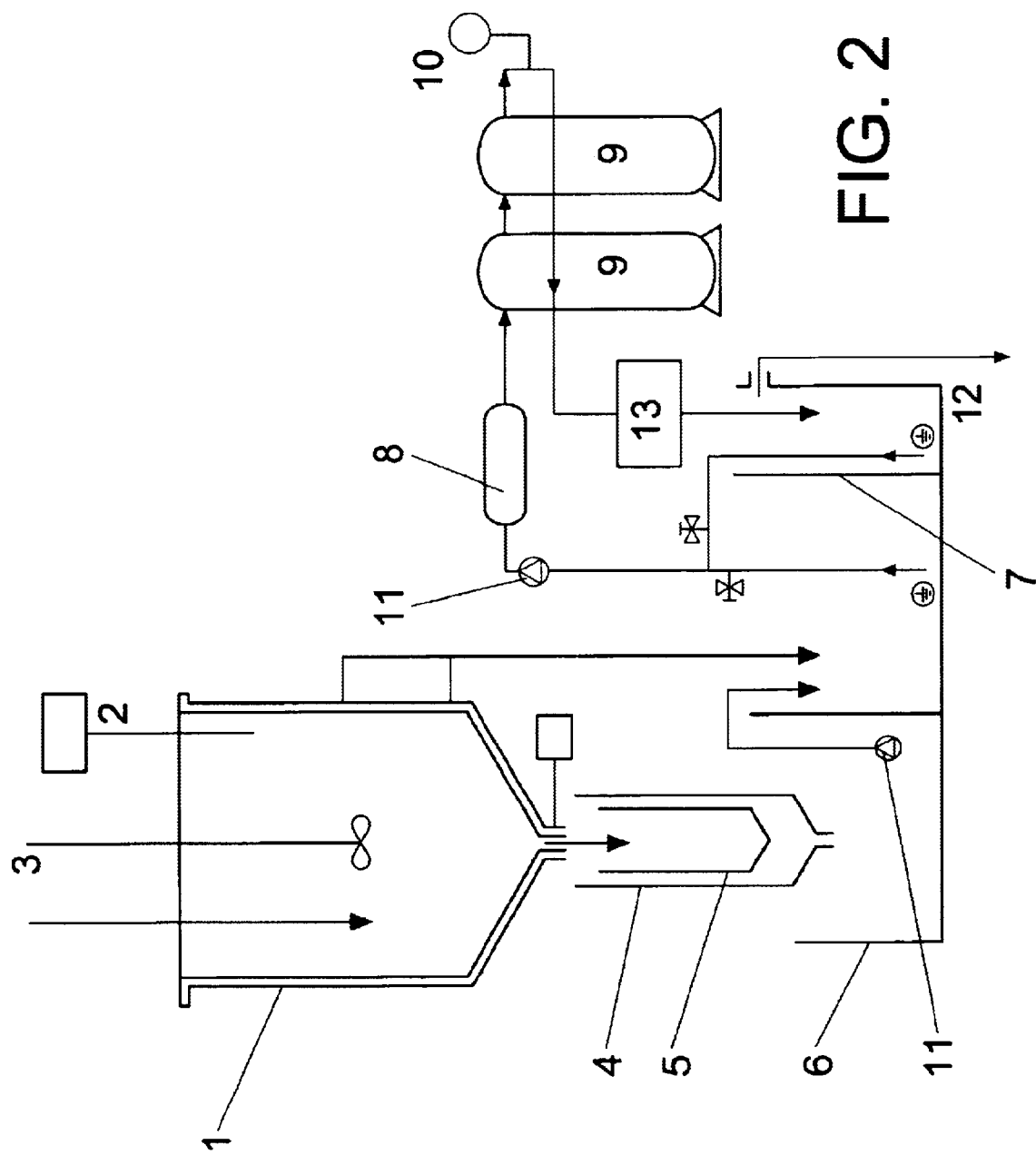
FIG. 2.—This is another diagrammatic view, similar to FIG. 1, incorporating an ultraviolet lamp.

FIG. 2 is a diagram of an installation that includes an ultraviolet lamp 13, which guarantees a greater degree of purification, the product being collected in tank 12, from where it exits towards the drain.

Figure 3:
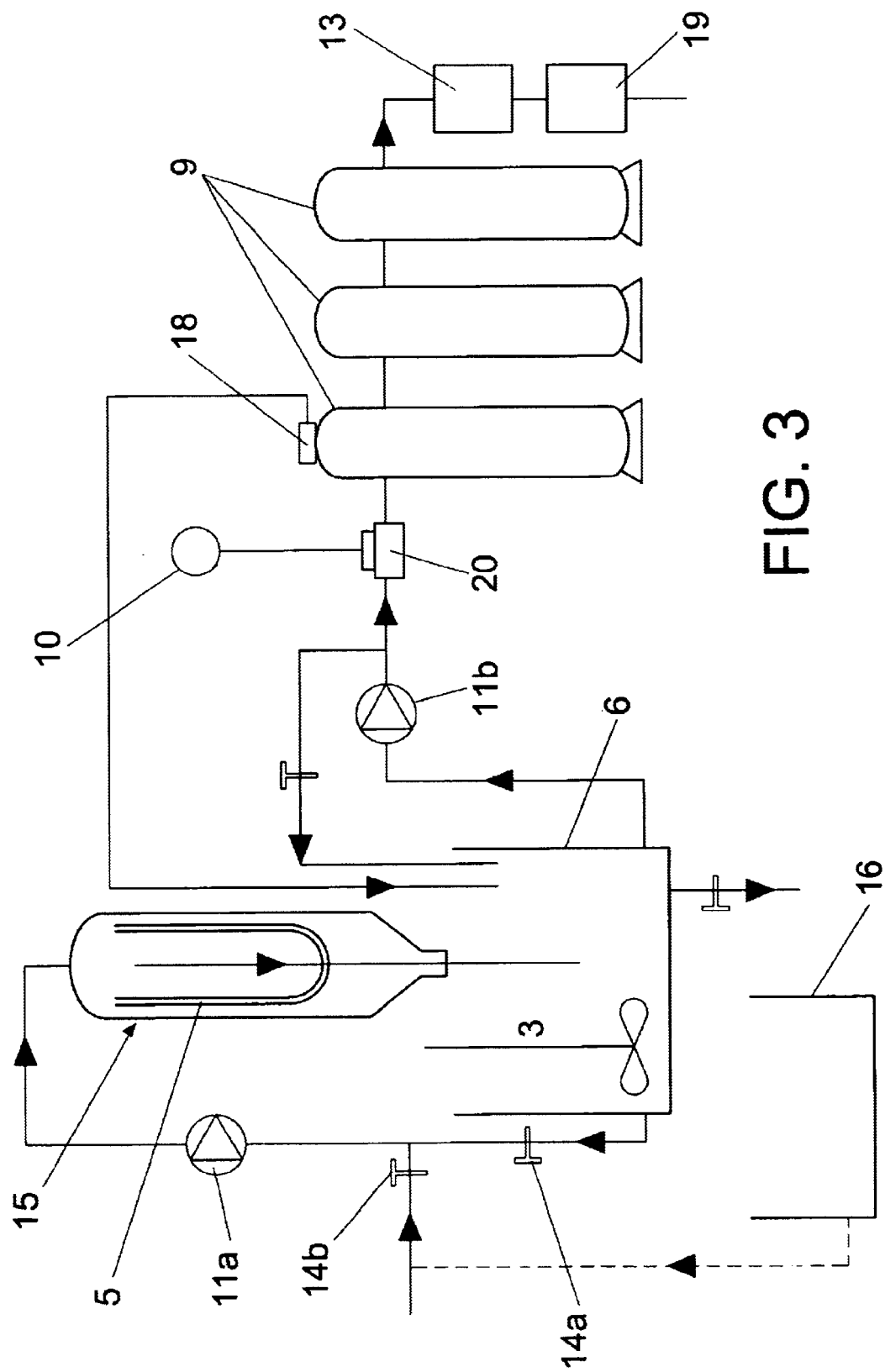
FIG. 3.—Samples of an installation for carrying out the purification process, including a pressure filter with filtering bags prepared with a pre-layer of diatomaceous earth.

A description is now going to be given of the installation in which the purification process has been carried out, with special reference to FIG. 3, where another manner of carrying out the invention is considered.

The dimensioning of the components of the system has been determined for a volume of trencher liquid to be purified of 460 l/h, since the system has to be dimensioned for different flows and loads of contaminants.

In order to commence the purification process, about 40 l of water are introduced into tank 6 (which has a capacity of around 500 l; the introduction can be done automatically or manually) and it is connected to the stirrer 3 and the pump 11a in closed circuit via the bag filter 15 and the stopcock 14a. After that, some diatomaceous earth is then added little by little and the circulation is kept up for at least 5 minutes.

Once the circulation time has ended, the filtering bags 5 of this pressure filter 15 are prepared with a preload of diatomaceous earth. At that moment the electrovalve 14a is closed and number 14b is opened, which causes the pumps 11a to suck the liquid to be purified and introduce it into the tank 6 with the solids being filtered down to a particle size of less than 50 microns.

In this pressure filter 15, a pretreatment or conditioning stage of the discharge takes place. In a second stage, the final treatment or reduction of the contaminant load is produced.

In this first pretreatment stage, what is sought is to reduce the load of solids present in the water coming from the drencher, and to proceed to an initial reduction of the contaminating load. For this purpose, a polypropylene bag filter (of no more than 50 microns) is provided for retaining all solids larger than this pore size. To help the filtration system diatomaceous earth is included, forming a pre-layer on the inside of the polypropylene bags, taking advantage of the selective permeability of this earth and the power it has to adsorb oils.

The objective is multiple:

To help in the filtering, improving it by preventing rapid clogging.

To retain the small percentage of oil from the preparations.

To protect the walls of the bag and thereby extend their life.

The final result of the combination of ball/diatomaceous earth is:

Very high reduction of sedimentable solids.

High reduction of suspended solids.

Reduction of the pesticide load.

Reduction of oils present.

In the case of proceeding to the purification of water from processing lines, these would first be stored in a retaining tank 16 of a suitable size so that the water can be purified at the necessary speed.

Figure 4:
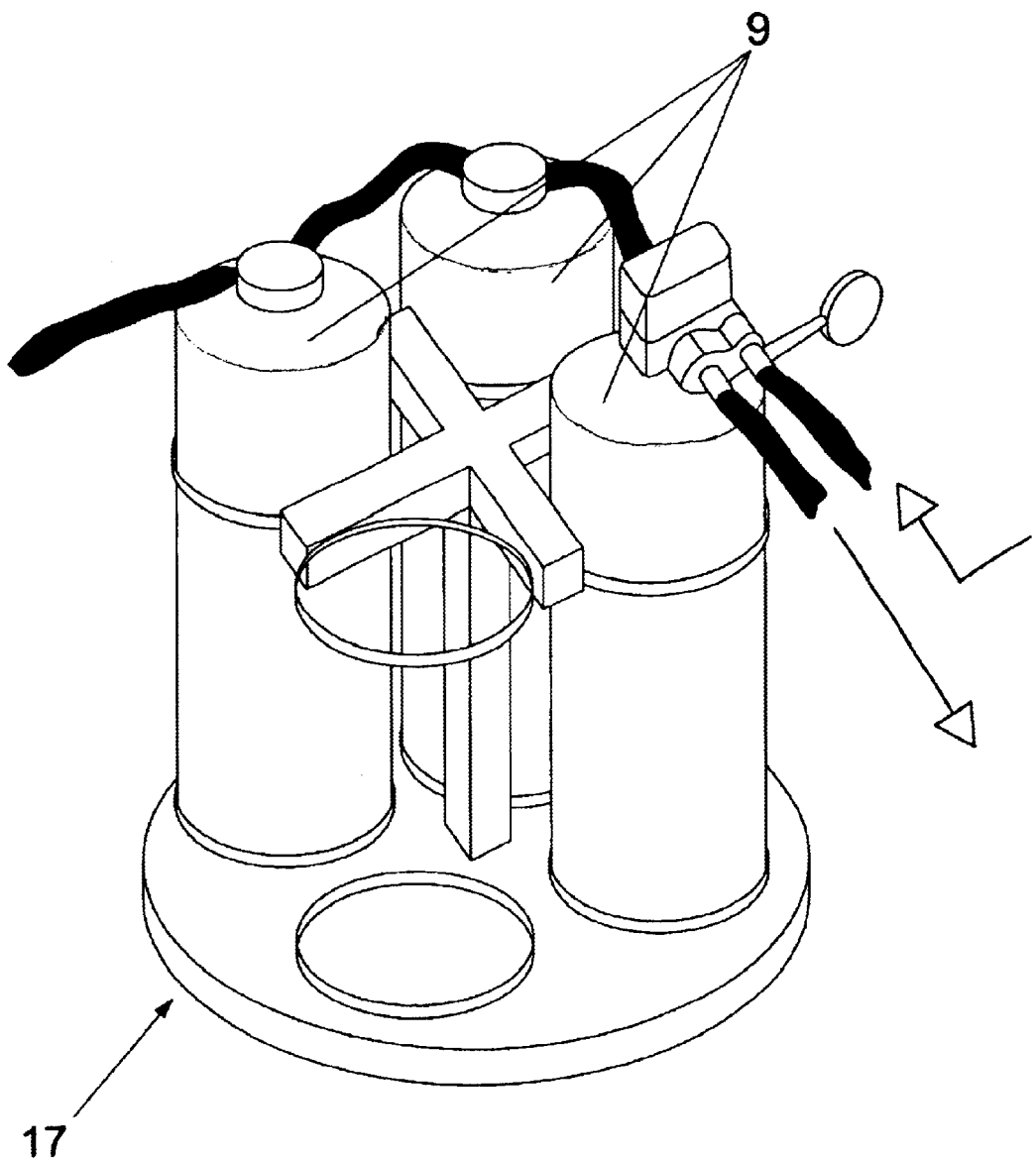
FIG. 4.—This is a perspective view of the rotating support carrying the activated carbon bottles.

Once the liquids have been filtered in the tank 6, the pump 11b is started up, driving the liquids through three bottles 9 of activated carbon making up the array of columns 9, with each of them having a volume of the order of 316 l. A minimum permanency of two hours for the liquid inside the bottles 9 of activated carbon must be guaranteed. For this, there is a litre counter with an electronic output connected to an electrical automatism that prevents the pump from continuing to drive the liquid until the liquid that is inside the bottles 9 has remained there for at least two hours. These control means provide that mixed clarified water is retained in each carbon column 9 for at least two hours. Moreover, this volumetric counter will also be in charge of warning that the activated carbon in the first bottle 9 is becoming exhausted and needs to be replaced. A telephone warning device can be connected so that the supplier company can proceed to carry out the change. The system has been designed so that a fourth bottle of activated carbon can be incorporated, as shown in FIG. 4. In this way, the third bottle would easily be able to be replaced by the spare one, with this third bottle taking over the position of the second one, which would in turn occupy the first position once the clogged up bottle had been removed. These four bottles 9 are located on a rotating plate 17, this entire process of permutation being carried out by means of a simple motorized or manual rotation through 90°, as can be easily deduced from observing the figure.

Control over the system is done by means of a programmable automation connected to a touch-sensitive screen enabling the user to programme all the operational parameters of the system, with the records of flows and consumptions, warnings of replacements, etc., and permitting connection to a personal computer for greater versatility in its handling. This computer can in turn be connected to another remote terminal by modem, permitting remote control.

The first filtering bottle 9 incorporates a reverse-wash valve 18 permitting this process to be carried out in the event of the activated carbon in the first bottle 9 becoming compacted, since this bottle is the one that suffers the greatest contaminant load. This process can be carried out automatically once the differential pressure between the inlet and the outlet exceeds a defined value. The water from the reverse-washing is returned to the tank 6 for being treated as if it were an ordinary part of the liquid for purifying.

Once the liquid exits from the bottles 9 of activated carbon, it could optionally be treated by means of ultraviolet lamps 13 and/or an ozoniser 19, before being discharged.

The reference 20 in FIG. 3 refers to a flow meter.

What is claimed is:

1. A purification system for wastewater from fruit-and vegetable-processing plants and from phytosanitary treatments, the system comprising:

a filter tank where a pretreatment step is carried out;

a tank for collecting clarified water resulting from the pretreatment step, said tank comprising a stirrer for uniformly mixing the clarified water;

pumping means for pumping mixed clarified water from said tank to a first activated carbon column of an array of activated carbon columns being prepared for purifying the mixed clarified water by adsorption up to established threshold values;

said first activated carbon column being connected by an outlet to an inlet of a subsequent activated carbon column, each further subsequent activated carbon column being connected by its inlet to the outlet of the preceding activated carbon column; and automatic control means for providing that mixed clarified water is retained in the carbon columns for at least two hours.

2. A purification system according to claim 1, wherein the tank-filter is a settling tank with at least two outlets for the clarified water, to which flocculent can be added, the sludge being extracted by gravity through the lower part thereof and sent to a filtering bag where it is retained, while the clarified water is sent to an intermediate tank, being joined to this the water which passes through said filtering bag and is received in a collection tank.

3. A purification system according to claim 2, wherein the filtering bag is arranged inside a metal frame which acts as a support for it and as a collector for the water passing through it on its way to the reception tank.

4. A purification system according to claim 1, wherein the tank-filter is a polypropylene bag filter that includes diatomaceous earth, with circulation being maintained in closed circuit from the tank containing water, the bags being filled with a pre-layer of this earth; a pump sucking the liquid to be purified and which passes through that filter to the reception tank, from where it is decanted to the array of columns of activated carbon.

5. A purification system characterized according to claim 1, wherein at the outlet from the array of columns of activated carbon is included an ultraviolet lamp.

6. A purification system for wastewater coming from fruit and vegetable processing plants and phytosanitary treatments in the field, according to claim 1, wherein the array of columns of activated carbon, three in number, is mounted on a rotating plate where there exists a fourth column.

* * * * *